United States Patent
Ozaki

(10) Patent No.: US 10,142,514 B2
(45) Date of Patent: Nov. 27, 2018

(54) IMAGE READING SYSTEM AND IMAGE READING DEVICE THEREIN

(71) Applicant: BROTHER KOGYO KABUSHIKI KAISHA, Nagoya, Aichi (JP)

(72) Inventor: Kazumasa Ozaki, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 218 days.

(21) Appl. No.: 15/198,460

(22) Filed: Jun. 30, 2016

(65) Prior Publication Data

US 2017/0017437 A1   Jan. 19, 2017

(30) Foreign Application Priority Data

Jul. 14, 2015   (JP) ................... 2015-140223

(51) Int. Cl.
*H04N 1/04* (2006.01)
*H04N 1/40* (2006.01)
*H04N 1/00* (2006.01)

(52) U.S. Cl.
CPC ..... *H04N 1/40012* (2013.01); *H04N 1/00408* (2013.01); *H04N 2201/0081* (2013.01); *H04N 2201/0094* (2013.01)

(58) Field of Classification Search
CPC .......... H04N 1/40012; H04N 1/00408; H04N 2201/0081; H04N 2201/0094
USPC ................................ 358/518, 505
See application file for complete search history.

(56) References Cited

U.S. PATENT DOCUMENTS

| 7,072,506 B1 | 7/2006 | Hirota et al. |
| 2013/0223732 A1* | 8/2013 | Motoyama ......... G06K 9/00456 382/165 |

FOREIGN PATENT DOCUMENTS

| JP | H11-331626 A | 11/1999 |
| JP | 2013-051652 A | 3/2013 |
| JP | 2013-179408 A | 9/2013 |

* cited by examiner

*Primary Examiner* — Houshang Safaipour
(74) *Attorney, Agent, or Firm* — Scully, Scott, Murphy & Presser, PC

(57) ABSTRACT

An image reading system comprises an image reading device and an image storage device. The image reading device comprises: a reading unit, a converting unit, a determining unit, a transmission unit. The image storage device comprises a storage unit, a receiving unit, an image processing unit. The determining unit is configured to determine whether the image data is color data, gray data, or binary data, and is configured to generate determination data indicating a result of the determination. When the determination data indicates that the image data is the color data, the image processing unit stores the transmission data. When the determination data indicates that the image data is the gray data, the image processing unit stores the luminance data without storing the color difference data. When the determination data indicates that the image data is the binary data, the image processing unit stores black-white image data.

5 Claims, 9 Drawing Sheets

A4 SIZE 300DPI(MAIN) × 300DPI(SUB)

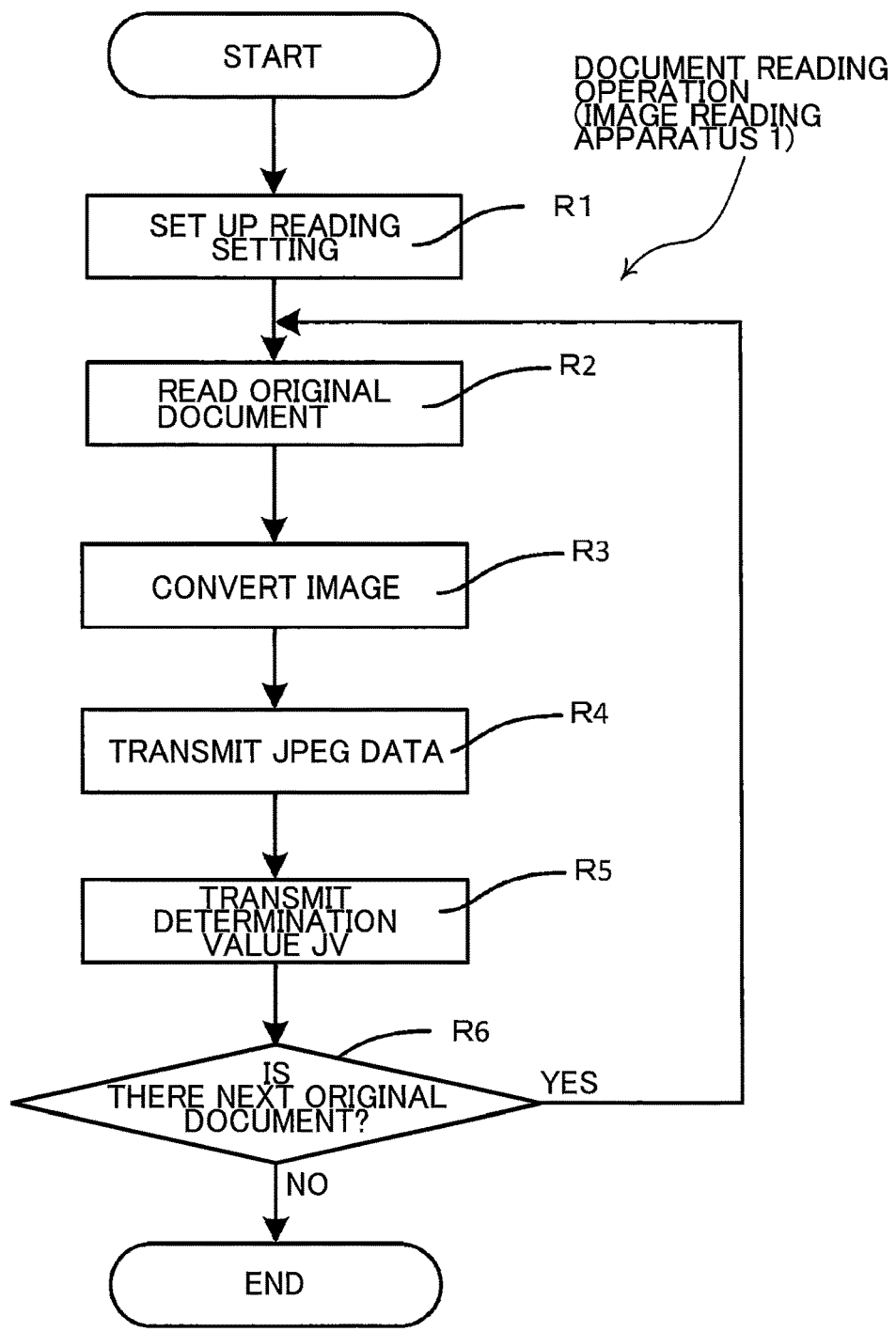

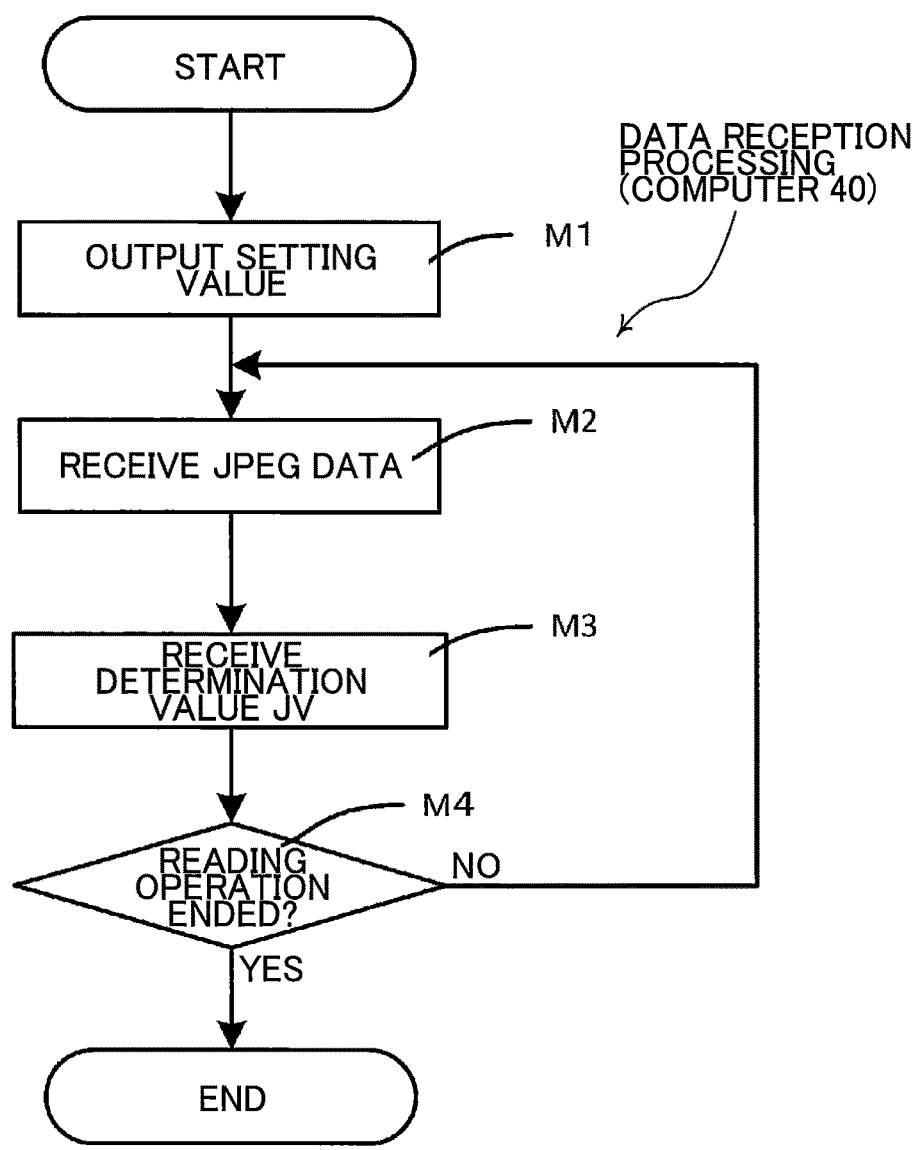

IMAGE READING SYSTEM AND IMAGE READING DEVICE THEREIN

CROSS REFERENCE TO RELATED APPLICATION

This application claims priority from Japanese Patent Application No. 2015-140223 filed Jul. 14, 2015. The entire content of the priority application is incorporated herein by reference.

TECHNICAL FIELD

The present disclosure relates to an image reading system.

BACKGROUND

An image reading system reads a document to acquire image data therefrom, determines a type of the document based on the acquired image data, converts the acquired image data into image data according to the document type, and stores the resultant image data in an external memory or computer connected to an external interface of an image reading apparatus body.

SUMMARY

A conventional image reading apparatus reads an image of an original document to acquire read image data of an RGB color system and converts the read image data of an RGB color system into image data of YCbCr color system. The resultant image data is divided into blocks having square image groups. Then, the image reading apparatus determines an image type by determining whether or not each of the blocks is an achromatic block, a monochrome block, or a grayscale block, converts the image data according to the determined image type, and stores the resultant image data in an external memory.

The image data is stored in a computer connected to the image reading apparatus. In this case, it is necessary to determine the type of the image data acquired through reading the document image, convert the read image data into target image data in accordance with the result of the determination, and transmit the resultant image data to the external computer. That is, it is necessary to acquire the entire one page of image data for determination of the image type, followed by conversion and transmission processes. This prolongs a time from the start of reading the document until the image data is transmitted to the external computer. That is, a long time is required until the image data is stored in the external computer.

An object thereof is to provide an image reading system capable of reducing a time from when the image reading apparatus starts reading the document until it stores the image data in the external computer.

According to one aspect, an image reading system comprises an image reading device and an image storage device. The image reading device comprises: a reading unit, a converting unit, a determining unit, a transmission unit. The image storage device comprises a storage unit, a receiving unit, an image processing unit. The reading unit is configured to read an original document on a pixel-to-pixel basis and generate image data including color difference data and luminance data. The converting unit is configured to convert the image data to transmission data, the image data being compressed in converting to the transmission data. The determining unit is configured to determine whether the image data is color data, gray data, or binary data, and is configured to generate determination data indicating a result of the determination. The transmission unit is configured to transmit the transmission data and the determination data to the image storage device. The receiving unit is configured to receive the transmission data and the determination data both transmitted by the transmission unit. The image processing unit is configured to perform: when the determination data indicates that the image data is the color data, storing the transmission data in the storage unit; when the determination data indicates that the image data is the gray data, decompressing the transmission data to regenerate the image data, and storing the luminance data in the storage unit without storing the color difference data; and when the determination data indicates that the image data is the binary data, decompressing the transmission data to regenerate the image data, converting the luminance data of the regenerated image data to black-white image data, and storing the black-white image data in the storage unit.

According to another aspect, an image reading device comprising a storage unit is configured to perform: reading an original document on a pixel-to-pixel basis and generating image data including color difference data and luminance data; converting the image data to transmission data, the image data being compressed in converting to the transmission data; determining whether the image data is color data, gray data, or binary data, and generating determination data indicating a result of the determination; when the determination data indicates that the image data is the color data, storing the transmission data in the storage unit; when the determination data indicates that the image data is the gray data, decompressing the transmission data to regenerate the image data, and storing the luminance data in the storage unit without storing the color difference data; and when the determination data indicates that the image data is the binary data, decompressing the transmission data to regenerate the image data, converting the luminance data of the regenerated image data to black-white image data, and storing the black-white image data in the storage unit.

BRIEF DESCRIPTION OF THE DRAWINGS

The particular features and advantages of the disclosure will become apparent from the following description taken in connection with the accompanying drawings, in which:

FIG. 6 is a flow chart illustrating steps in image reading operation executed by the image reading apparatus according to the embodiment;

FIG. 7 is a flow chart illustrating steps in data reception processing executed by a computer according to the embodiment;

DETAILED DESCRIPTION

[Embodiment]

Figure 1:
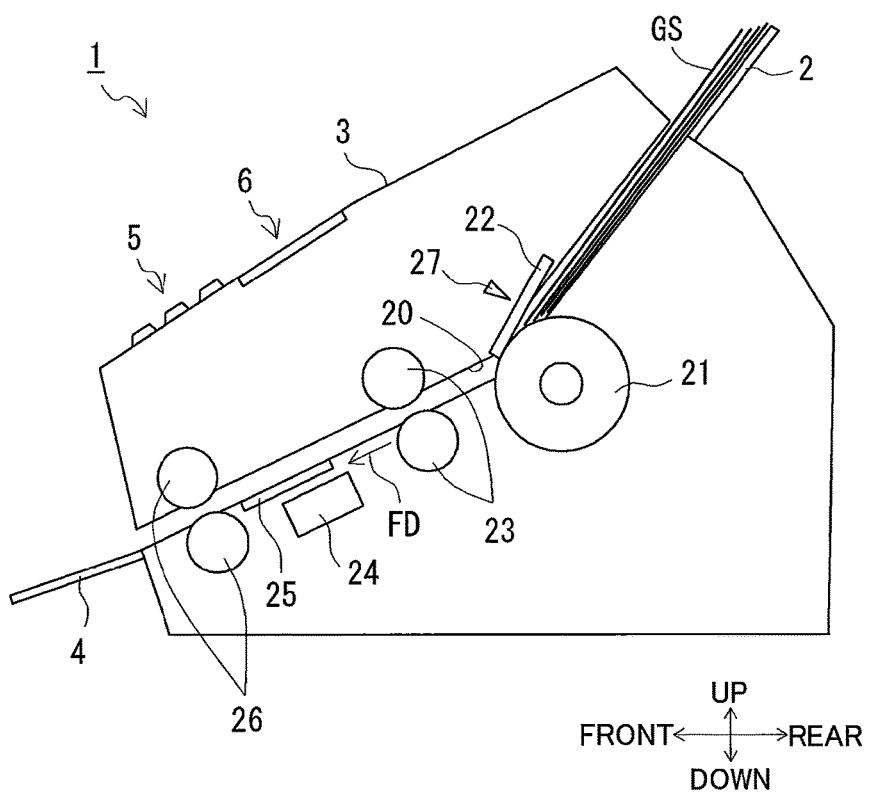
FIG. 1 is an image reading apparatus according to an embodiment.

An image reading system, an image reading apparatus 1, and a computer 40 according to a first embodiment will be described while referring to the accompanying drawings wherein like parts and components are designated by the same reference numerals to avoid duplicating description.

The terms "upward", "downward", "upper", "lower", "above", "below", "beneath", "right", "left", "front", "rear" and the like will be used throughout the description assuming that the image reading apparatus 1 is disposed in an orientation in which it is intended to be used. In use, the image reading apparatus 1 is disposed as shown in FIG. 1.

21 Mechanical Configuration of Image Reading Apparatus 1>

As illustrated in FIG. 1, the image reading apparatus 1 includes a supply tray 2, a main body 3, and a discharge tray 4. An operating unit 5 and a display unit 6 are disposed on an upper surface of the main body 3. The operating unit 5 includes a power switch and various setting buttons and receives an operation instruction from a user. The display unit 6 includes an LCD and displays an operation state of the image reading apparatus 1.

A conveying path is formed inside the main body 3. An original document GS placed on the supply tray 2 is conveyed along the conveying path 20 in a conveying direction FD and discharged to the discharge tray 4. A supply roller 21, a separating pad 22, a pair of upstream side conveying rollers 23, a reading unit 24, a platen glass 25, and a pair of downstream side conveying rollers 26 are disposed along the conveying path 20.

The supply roller 21 feeds, one by one, original documents GS placed on the supply tray 2 in cooperation with the separating pad 22. The upstream side conveying roller pair 23 and the downstream side conveying roller pair 26 are driven by a conveying motor MT (see FIG. 2). The platen glass 25 has a light transmittance property and is disposed along the conveying path 20 at a lower side of the conveying path 20. The conveying roller pairs 23 and 26 operate so as to allow the original document GS fed from the supply roller 21 to pass over the platen glass 25.

In the present embodiment, the original document GS is placed on the supply tray 2 such that a reading surface of the original document GS faces a placing surface of the supply tray 2. The reading unit 24 is disposed below the conveying path 20 and reads an image on the reading surface of the original document GS passing over the platen glass 25. A document sensor 27 is disposed in the supply tray 2 and is configured to be turned ON when the original document GS is placed on the supply tray 2 and turned OFF when the original document GS is not placed on the supply tray 2. In the reading unit 24, a plurality of photoelectric conversion elements, each of which corresponds to a pixel, are arranged in a line. An arrangement direction of the photoelectric conversion elements is a main scan direction, and the conveying direction FD is a sub scan direction.

<Electrical Configuration of Image Reading Apparatus 1 and Computer 40>

Figure 2:
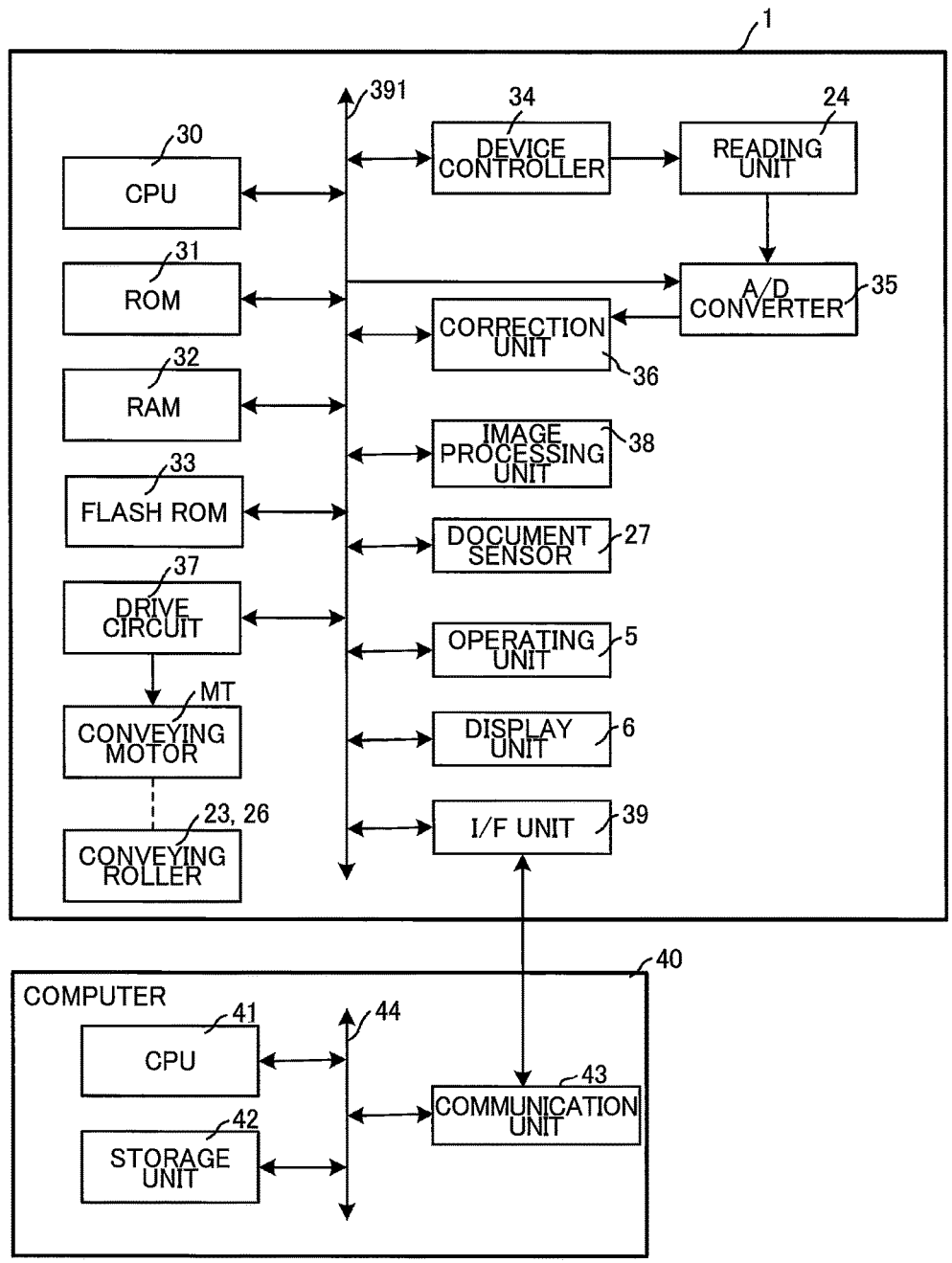
FIG. 2 indicates an electrical configuration of the image reading apparatus according to the embodiment.

Electrical configurations of the image reading apparatus 1 and a computer 40 will be described with reference to FIG. 2. As illustrated in FIG. 2, the image reading apparatus 1 includes, as main components, a CPU 30, a ROM 31, a RAM 32, a flash ROM 33, a device controller 34, an A/D converter 35, a correction unit 36, a drive circuit 37, an image processing unit 38, and an interface unit (hereinafter, referred to as I/F unit) 39. The above components are connected, via a bus 391, to the operating unit 5, display unit 6, and document sensor 27.

The ROM 31 stores therein programs for executing various operations of the image reading apparatus 1, such as image reading operation to be described later. The CPU 30 controls respective components according to the programs read out from the ROM 31. The flash ROM 33 is a readable/writable non-volatile memory and stores a setting value received from the computer 40. The RAM 32 temporarily stores data generated by control processing of the CPU 30.

The device controller 34 is connected to the reading unit 24 and transmits a lighting control signal for controlling a not-illustrated light source of the reading unit 24 to the reading unit 24 in accordance with a light amount adjustment value set based on a instruction from the CPU 30. Further, based on an instruction from the CPU 30, the device controller 34 transmits a clock signal and a line signal to a not-illustrated light receiving unit of the reading unit 24 so as to sequentially operate the photoelectric conversion elements of one line of the light receiving unit. The clock signal is a signal indicating a timing at which the photoelectric conversion elements are sequentially operated. The line signal is a signal indicating an output timing for each line. Upon reception of these signals from the device controller 34, the reading unit 24 lights the light source and transmits, to the A/D converter 35, an analog signal based on a light amount that the light receiving unit has received.

The A/D converter 35 is connected to the reading unit 24 and converts an analog signal into digital image data based on an instruction from the CPU 30. Further, the A/D converter 35 has a predetermined resolution. For example, in an 8-bit grayscale image, the resolution is represented as a grayscale value from "0" (zero) to "255". In this case, the A/D converter 35 converts the analog signal received from the reading unit 24 into 8-bit (0 to 255) grayscale data as digital image data. The resultant digital image data is transmitted from the A/D converter 35 to the correction unit 36.

The correction unit 36 performs various corrections, including shading correction, for the digital image data transmitted from the A/D converter 35. The digital image data is corrected to an RGB value by the correction unit 36. The RGB value is then stored in the RAM 32 in units of one page. The "one page" refers to a data unit obtained by reading a one-page original document GS in image reading operation to be described later.

Although details will be described later, the image processing unit 38 applies JPEG compression to the RGB value stored in the RAM 32 to generate color JPEG data. Further, the image processing unit 38 generates, based on the RGB values corresponding to one page stored in the RAM 32, a determination value JV indicating whether an image type of the page is a color page, a gray page, or a binary page (black-white page).

The drive circuit 37 is connected to the conveying motor MT and drives the conveying motor MT based on a drive instruction received from the CPU 30. The drive circuit 37 drives the conveying motor MT into rotation according to a rotation amount and a rotation direction designated by the drive instruction. When the conveying motor MT is rotated by a predetermined amount, the supply roller 21 and conveying rollers 23, 26 are rotated by a predetermined angle, whereby the original document GS is conveyed by a predetermined distance along the conveying path 20.

The I/F unit 39 enables communication between the image reading apparatus 1 and the computer 40. The I/F unit 39 transmits the JPEG data stored in the RAM 32 to the computer 40 under the control of, e.g., the CPU 30. Further, the I/F unit 39 receives various setting values from the computer 40 and transmits the setting values to the CPU 30.

A detailed configuration of the image processing unit 38 of the image reading apparatus 1 will be described with reference to FIG. 3. In accordance with an instruction from the CPU 30, the image processing unit 38 reads the RGB value stored in the RAM 32 and converts the read RGB value into color JPEG data. The color JPEG data is stored in the RAM 32.

Figure 3:
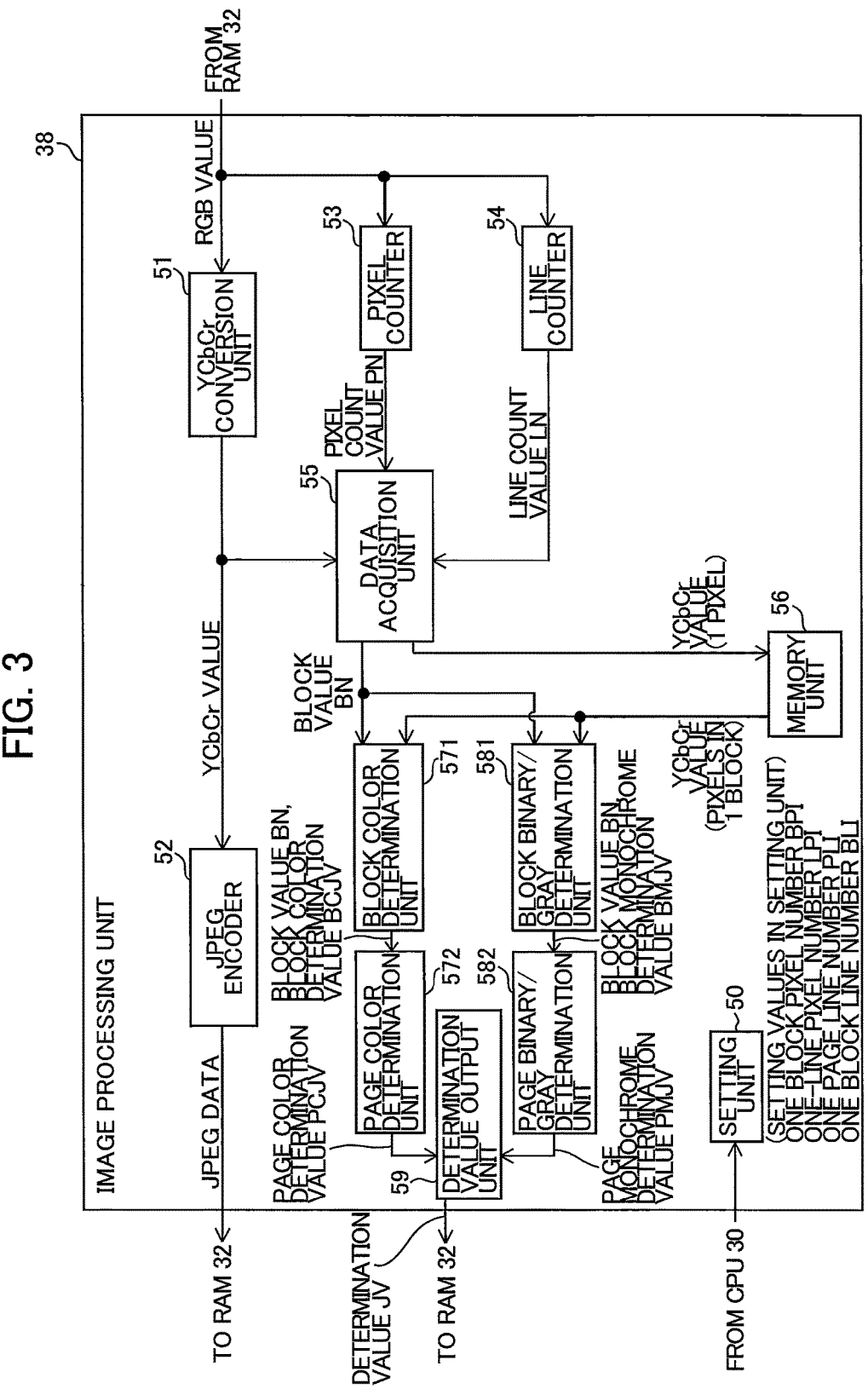
FIG. 3 is a block diagram illustrating a structure of an image processing unit according to the embodiment.

As illustrated in FIG. 3, the image processing unit 38 includes, as main components, a setting unit 50, a YCbCr conversion unit 51, a JPEG encoder 52, a pixel counter 53, a line counter 54, a data acquisition unit 55, a memory unit 56, a block color determination unit 571, a page color determination unit 572, a block binary/gray determination unit 581, a page binary/gray determination unit 582, and a determination value output unit 59.

The setting unit 50 stores various setting values used in the image processing unit 38. The setting values include a one block pixel number BPI, a one block line number BLI, a one-page line number PLI, and a one-line pixel number LPI. The one block pixel number BPI indicates the number of pixels included in one block for each line. The one block line number BLI indicates the number of lines included in one block. The one-page line number PLI indicates the number of lines included in one page. The one-line pixel number LPI indicates the number of pixels included in one line. The above setting values are set by the CPU 30 in image reading operation to be described later.

Figure 4:
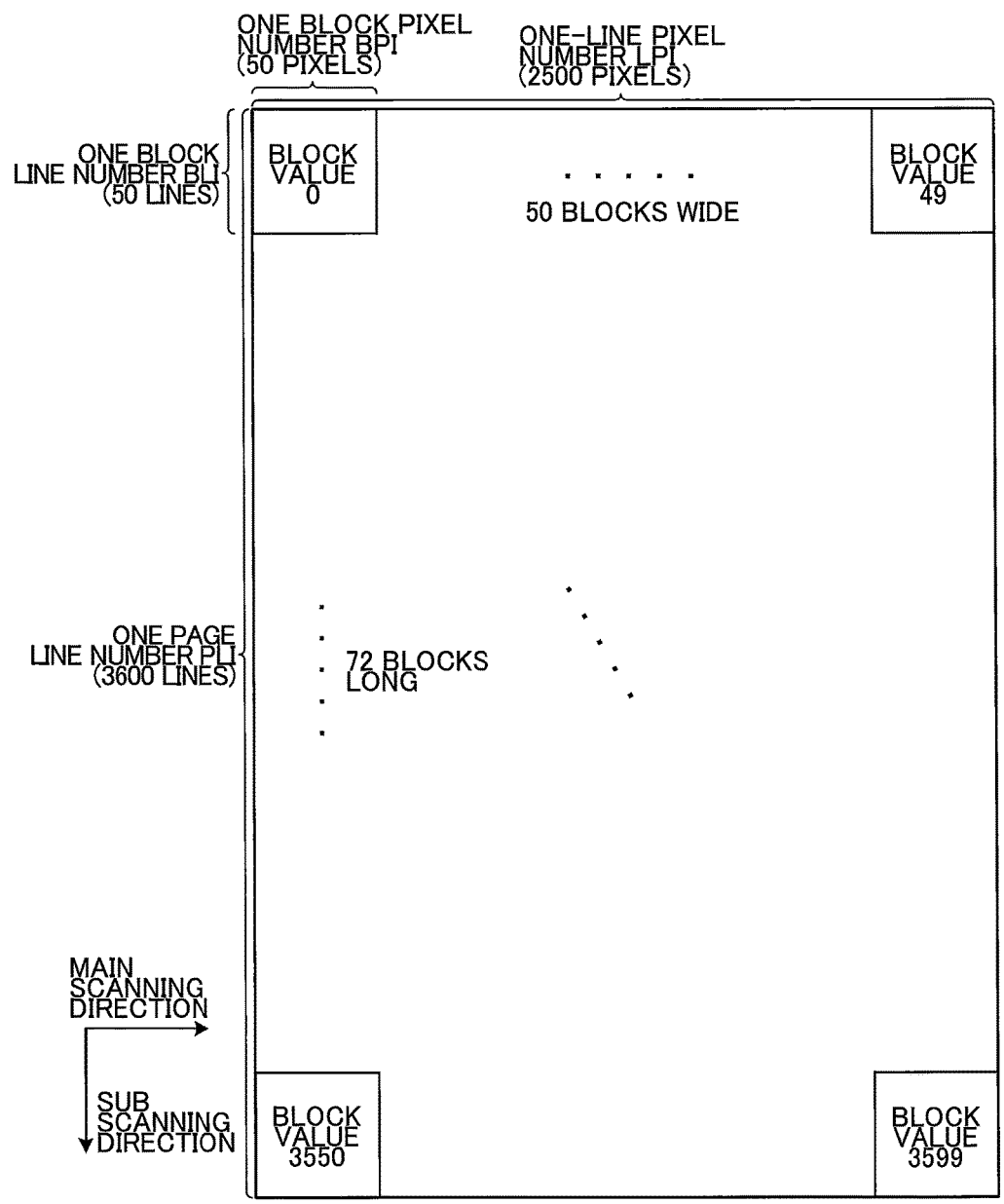
FIG. 4 illustrates disposition of blocks in a page of an original document according to the embodiment.
Figure 5A:
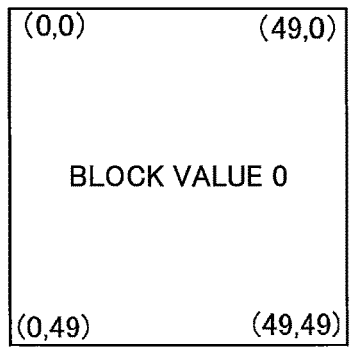
FIG. 5A illustrates a detailed configuration of a block having a block value zero from among the blocks indicated in FIG. 4.
Figure 5B:
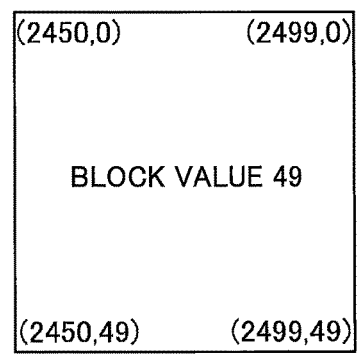
FIG. 5B illustrates a detailed configuration of a block having a block value 49 from among the blocks indicated in FIG. 4.
Figure 5C:
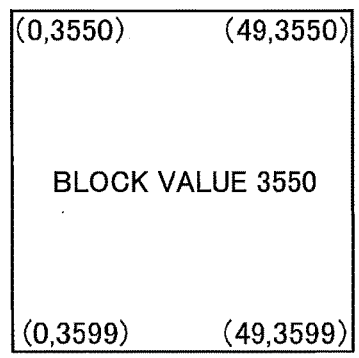
FIG. 5C illustrates a detailed configuration of a block having a block value 3550 from among the blocks indicated in FIG. 4.
Figure 5D:
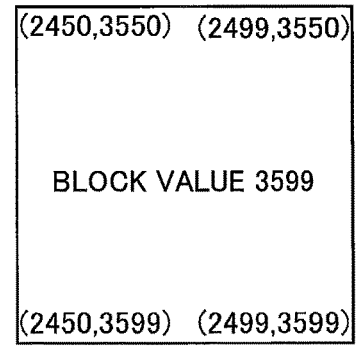
FIG. 5D illustrates a detailed configuration of a block having a block value 3599 from among the blocks indicated in FIG. 4.

The following describes the block of the present embodiment with reference to FIG. 4. The block color determination unit and block binary/gray determination unit, which are to be described later, make their determination by dividing one-page image data of a YCbCr color system into blocks. As illustrated in FIG. 4, the block represents an image group obtained by dividing one-page image data into a plurality of rectangular areas. Specifically, the image data of the present embodiment has A4 size and has a resolution of 300 dpi in both the main and sub scan directions. In the present embodiment, the one block pixel number BPI is 50, and one block line number BLI is 50. Further, in each block, a block value BN is calculated as described later. Thus, positions of the blocks in the one-page image data are represented as follows. As illustrated in FIG. 4 and FIG. 5A, a block having a block value BN of 0 (zero) is the first block in the main scan direction and the first block in the sub scan direction and composed of pixels in an area surrounded by a range of 0-th pixel to 49-th pixel in the main scan direction and a range of 0-th line to 49-th line in the sub scan direction. As illustrated in FIG. 4 and FIG. 5B, a block having a block value BN of 49 is the last block in the main scan direction and the first block in the sub scan direction and composed of pixels in an area surrounded by a range of 2450-th pixel to 2499-th pixel in the main scan direction and a range of 0-th line to 49-th line in the sub scan direction. As illustrated in FIG. 4 and FIG. 5C, a block having a block value BN of 3550 is the first block in the main scan direction and the last block in the sub scan direction and composed of pixels in an area surrounded by a range of 0-th pixel to 49-th pixel in the main scan direction and a range of 3550-th line to 3599-th line in the sub scan direction. As illustrated in FIG. 4 and FIG. 5D, a block having a block value BN of 3599 is the last block in the main scan direction and the last block in the sub scan direction and composed of pixels in an area surrounded by a range of 2450-th pixel to 2499-th pixel in the main scan direction and a range of 3550-th line to 3599-th line in the sub scan direction. In this manner, the one-page image data is divided into 3,600 blocks.

The following describes the YCbCr conversion unit 51 with reference to FIG. 3. The YCbCr conversion unit 51 converts an RGB value of an RGB color system that the correction unit 36 stores in the RAM 32 into a YCbCr value of a YCbCr color system. The YCbCr value includes luminance data representing a luminance Y of each pixel, blue-difference data representing a blue-difference Cb of each pixel, and red-difference data representing a red-difference Cr of each pixel. The YCbCr value is transmitted to the JPEG encoder 52 and the data acquisition unit 55. The luminance Y, blue-difference Cb, and red-difference Cr can each assume values from 0 to 255. A color having a luminance Y of 0 is black, and a color having an illuminance Y of 255 is white. A color having a blue-difference Cb of 128 is achromatic, and as the blue-difference Cb deviates from 128, saturation becomes higher. A color having a red-difference Cr of 128 is achromatic, and as the red-difference Cr deviates from 128, saturation becomes higher. The red-difference data and the blue-difference data are examples of color difference data.

The JPEG encoder 52 compresses the YCbCr value received from the YCbCr conversion unit 51, adds color header information to the compressed YCbCr value to thereby generate color JPEG data. The JPEG data is stored in the RAM 32. The header information includes data according to the JPEG format, such as a start marker (SOI), a DQT segment, a DRI segment, an SOF segment, a DHT segment, and an SOS segment. The header is an example of sub data.

The pixel counter 53 counts an input frequency of the RGB value to generate a pixel count value PN indicating an order of a pixel from a first pixel in each line. Specifically, when the pixel counter 53 counts the input of the RGB value in a condition where the set pixel count value PN is smaller than the one-line pixel number LPI, the pixel counter 53 adds 1 to the set pixel count value PN. When the pixel count value PN coincides with the one-line pixel number LPI stored in the setting unit 50, the pixel counter 53 immediately resets the pixel count value PN to 0 (zero), which indicates the start of the line. The pixel count value PN is transmitted to the data acquisition unit 55.

The line counter 54 counts the input of the RGB value to generate a line count value LN indicating the number of lines counted from the start of a reading operation. Specifically, when the line counter 54 counts the input of the RGB value in a condition where the set line count value LN does not coincide with the one-page line number PLI, the line counter 54 adds 1 (one) to the set line count value LN. When the set line count value LN coincides with the one-page line number PLI stored in the setting unit 50, the line counter 54 immediately resets the line count value LN to 0 (zero), which indicates a start of the page. The line count value LN is transmitted to the data acquisition unit 55.

The data acquisition unit 55 acquires the YCbCr value received from the YCbCr conversion unit 51 when the pixel count value PN is counted. The data acquisition unit 55 stores the acquired YCbCr value at a memory address of the memory unit 56 assigned by the pixel count value PN and the line count value LN.

The data acquisition unit 55 determines whether the line is a final line in accordance with the following method. Firstly, the data acquisition unit 55 divides the line count value LN by the one block line number BLI, and then rounds the quotient down to the nearest integer. Secondly, the obtained integer value is multiplied by a one-line block number (described later) to thereby obtain a first pixel block number. The first pixel block number corresponds to the block value BN of the first block in the main scan direction in a line of the line count value LN.

When the line count value LN is a value obtained by subtracting 1 from an integral multiple of the one block line number BLI, the data acquisition unit 55 determines that the relevant line is a block final line. In the line determined to be the block final line, the data acquisition unit 55 divides the pixel count value PN by the one block pixel number BPI, and then round the quotient down to the nearest integer. Then, the data acquisition unit 55 adds the first pixel block number to the obtained integer, thereby obtaining the block value BN. The calculated block value BN is transmitted to the block color determination unit 571 and the block binary/gray determination unit 581 every time the one block pixel number BPI is counted (every time the pixel count value PN represents the one block pixel number BPI). The one-line block number is a value obtained by dividing the one-line pixel number LPI by the one block pixel number BPI, i.e., the number of blocks in one line. In the present embodiment, the one-line block number is 50.

The memory unit 56 stores therein the YCbCr values corresponding to the number of pixels included in one page. The memory unit 56 stores the YCbCr value of each pixel at a memory address assigned by the pixel count value PN and the line count value LN.

The block color determination unit 571 receives the block value BN and then reads out, from the memory unit 56, the YCbCr values of all the pixels included in a target block corresponding to the received block value BN. The block color determination unit 571 counts a blue-difference pixel number BPN which is the number of pixels whose blue-difference Cb is in a range of 112 to 143. Then, among the pixels included in the block whose blue-difference Cb falls outside the range of 112 to 143, the block color determination unit 571 counts a red-difference pixel number RPN which is the number of pixels whose red-difference Cr is in a range of 112 to 143. The block color determination unit 571 determines whether the summation of the red-difference pixel number RPN and the blue-difference pixel number BPN exceeds 2,425, which is 97% of the total number of pixels in the block. When the summation exceeds 2,425, the block color determination unit 571 sets a block color determination value BCJV as a determination value indicating that the target block is an achromatic block; otherwise, when the value does not exceed 2,425, the block color determination unit 571 sets the block color determination value BCJV as a determination value indicating that the target block is a color block. After setting the block color determination value BCJV of the target block, the block color determination unit 571 generates the block color determination value BCJV of the target block and transmits the block value BN and the block color determination value BCJV of the target block to the page color determination unit 572.

The page color determination unit 572 receives the block value BN and then stores therein the block color determination value BCJV and the received block value BN in correlation with one another. When receiving the last block value BN of one page to be described later, the page color determination unit 572 counts the number of blocks whose determination value shows that the block color determination value BCJV indicates the color block as a color block number CBN. The page color determination unit 572 determines whether the color block number CBN exceeds 7.2, which is 0.2% of the total number of blocks in one page. When the color block number CBN exceeds 7.2, the page color determination unit 572 sets a page color determination value PCJV so as to indicate a color page; otherwise, when the color block number CBN does not exceed 7.2, the page color determination unit 572 sets the page color determination value PCJV so as to indicate an achromatic page. After setting the page color determination value PCJV, the page color determination unit 572 generates the page color determination value PCJV and transmits the generated page color determination value PCJV to the determination value output unit 59. The last block value BN of one page is a value calculated from the one-line pixel number LPI, one page line number PLI, one block pixel number BPI, and one block line number BLI. In the present embodiment, the last block value BN is 3,599.

The block binary/gray determination unit 581 receives the block value BN and then reads out, from the memory unit 56, the YCbCr values of all the pixels included in the target block corresponding to the block value BN. The block binary/gray determination unit 581 counts a light pixel number LPN whose luminance Y is 224 or higher and counts a dark pixel number DPN whose luminance is 63 or lower. The block binary/gray determination unit 581 determines whether the summation of the dark pixel number DPN and the light pixel number LPN exceeds 1,000, which is 40% of the total number of pixels in the block. When the value exceeds 1,000, the block binary/gray determination unit 581 sets a block monochrome determination value BMJV so as to indicate that the target block is a binary block; otherwise, when the value does not exceed 1,000, the block binary/gray determination unit 581 sets the block monochrome determination value BMJV as a determination value so as to indicate that the target block is a gray block. After setting the block monochrome determination value BMJV of the target block, the block binary/gray determination unit 581 generates the block monochrome determination value BMJV and transmits the block value BN and the block monochrome determination value BMJV of the target block to the page binary/gray determination unit 582.

The page binary/gray determination unit 582 receives the block value BN and then stores therein the block monochrome determination value BMJV and the block value BN in correlation with each other. When the last block value BN of one page is input to the page binary/gray determination unit 582, the page binary/gray determination unit 582 counts the number of blocks which is a determination value indicating that the block monochrome determination value BMJV indicates the gray block as a gray block number GBN. The page binary/gray determination unit 582 determines whether the gray block number GBN exceeds 1.08 which is 0.03% of the total number of blocks in one page. When the gray block number GBN exceeds 1.08, the page binary/gray determination unit 582 sets a page monochrome determination value PMJV as a determination value indicating a binary page; otherwise, when the gray block number GBN does not exceed 1.08, the page binary/gray determination unit 582 sets the page monochrome determination value PMJV as a determination value indicating a binary page. After setting the page monochrome determination value PMJV, the page binary/gray determination unit 582 generates the page monochrome determination value PMJV and transmits the generated page monochrome determination value PMJV to the determination value output unit 59.

The determination value output unit 59 receives the page color determination value PCJV and the page monochrome determination value PMJV and then determines whether the page color determination value PCJV indicates a color page. When the page color determination value PCJV indicates a color page, the determination value output unit 59 stores, in the RAM 32, a determination value that indicates a color page as a determination value JV. Otherwise, when the page color determination value PCJV indicates an achromatic page, the determination value output unit 59 stores, in the RAM 32, a determination value set to the page monochrome determination value PMJV as the determination value JV. That is, when the page monochrome determination value PMJV indicates a binary page, the determination value output unit 59 outputs a determination value indicating the binary page as the determination value JV; otherwise, when the page monochrome determination value PMJV indicates a gray page, the determination value output unit 59 outputs a determination value indicating the gray page as the determination value JV.

As illustrated in FIG. 2, the computer 40 includes, as main components, a CPU 41, a storage unit 42, a bus 44, and a communication unit 43. The storage unit 42 stores therein programs for executing various operations of the computer 40, such as data reception processing and data conversion processing to be described later. The CPU 41 controls respective components on the basis of the programs read out from the storage unit 42. The communication unit 43 enables communication between the computer 40 and the image reading apparatus 1. The storage unit 42 temporarily stores data generated by control processing of the CPU 41. The bus 44 connects the CPU 41, the storage unit 42, and the communication unit 43 to one another.

<Operation of Image Reading Apparatus 1>

The following describes operation of the image reading apparatus 1 with reference to FIG. 6. The image reading apparatus 1 executes image reading operation illustrated in FIG. 6. Processing R1 to processing R6 in the image reading operation are executed by the CPU 30.

(Image Reading Operation)

A user places a document on the supply tray 2, and a document reading start instruction is issued from the computer 40 and input to the image reading apparatus 1, whereby the image reading operation illustrated in FIG. 6 is started. Upon start of the image reading operation, the CPU 30 makes a reading setting (R1). Specifically, the CPU 30 stores a setting value received from the computer 40 in the flash ROM 33. The CPU 30 sets, in the image processing unit 38, a setting for generating JPEG data, a setting for outputting a determination value JV, 50 as the one block pixel number BPI, 50 as the one block line number BLI, 3600 as the one-page line number PLI, and 2500 as the one-line pixel number LPI. The CPU 30 sets, in the correction unit 36 and the A/D converter 35, a setting for generating RGB values of one page having 2,500 pixels in the main scan direction and 3,600 lines in the sub scan direction.

The CPU starts the document reading operation (R2). Specifically, the CPU 30 transmits a reading start signal to the computer 40. The CPU 30 outputs a drive instruction to the drive circuit 37 and makes the reading unit 24 read the original document GS. The CPU 30 makes the A/D converter 35 convert the read analog signal into digital image data. The CPU 30 makes the correction unit 36 correct the digital image data to an RGB value and stores the obtained RGB value in the RAM 32.

The CPU 30 starts image conversion processing (R3). Specifically, the CPU 30 makes the image processing unit 38 convert the RGB value stored in the RAM 32 into color JPEG data and stores the obtained color JPEG data in the RAM 32. After conversion into the color JPEG data, the CPU 30 stores the determination value JV in the RAM 32.

The CPU 30 transmits, to the computer 40, JPEG data to which color header information is prepended (R4). This transmission processing is executed every time the JPEG data is stored in the RAM 32.

After the determination value JV is stored in the RAM 32, the CPU 30 transmits the determination value JV to the computer 40 (R5). The CPU 30 determines whether or not the document sensor 27 is ON (R6). When the document sensor 27 is ON (Yes in R6), the CPU 30 proceeds to processing R2 so as to read the next original document GS. When the document sensor 27 is not ON (No in R6), the CPU 30 transmits a reading end signal to the computer 40 and ends the image reading operation.

Figure 8:
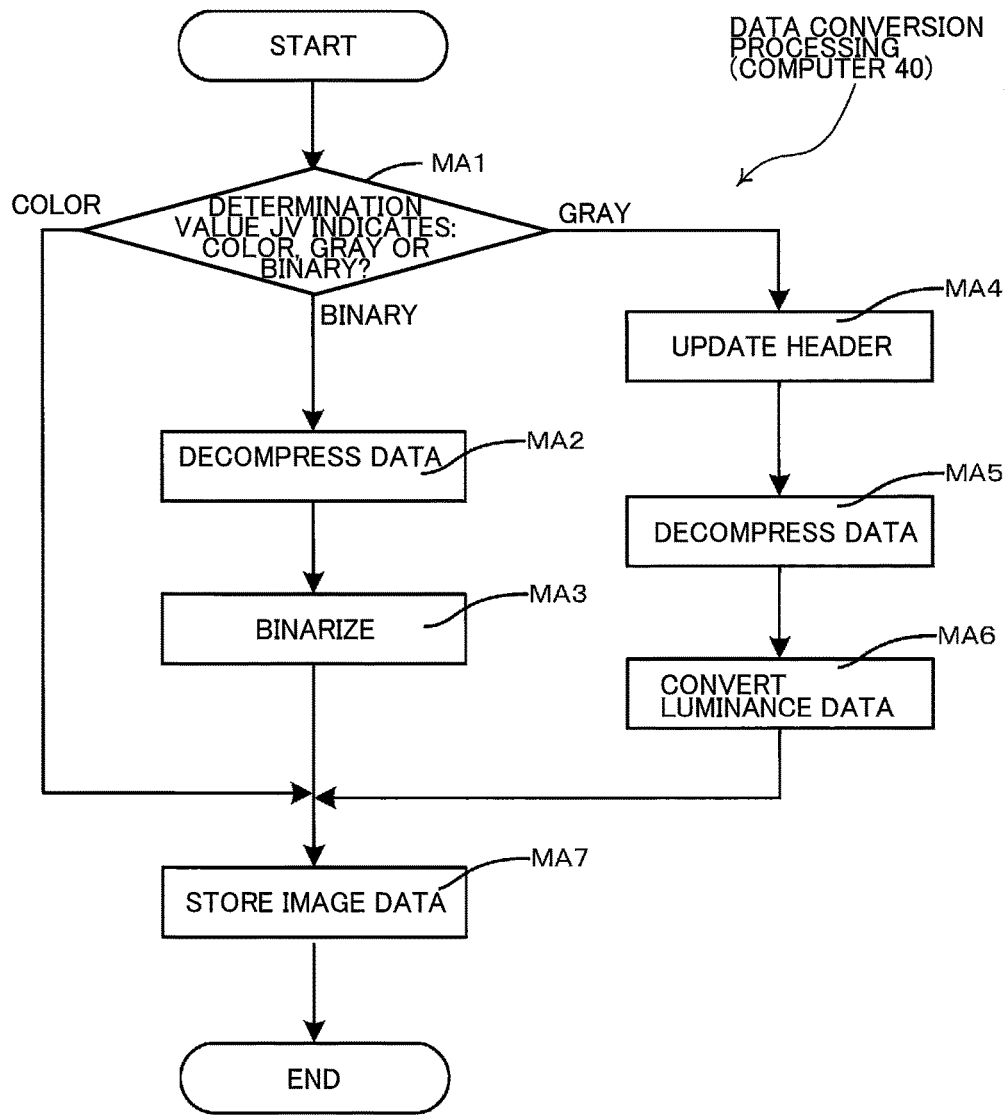
FIG. 8 is a flow chart illustrating steps in data conversion processing executed by the computer according to the embodiment.

The following describes operation of the computer 40 with reference to FIGS. 7 and 8. The computer 40 executes data reception processing illustrated in FIG. 7 and data conversion processing illustrated in FIG. 8. Processing M1 to processing M4 in the data reception processing and processing MA1 to processing MA7 in the data conversion processing are executed by the CPU 41.

(Data Reception Processing)

A user uses the computer 40 to activate a program for controlling the image reading apparatus 1, makes the reading settings, and starts the reading operation, whereby the data reception processing is executed. In the present embodiment, in the reading settings set by the user, the image data has A4 size and has a reading resolution of 300 dpi in both the main and sub scan directions.

The CPU 41 outputs a setting value to the image reading apparatus 1 (M1). Specifically, the CPU 41 calculates 2,500 as the one-line pixel number LPI and 3,600 as the one-page line number PLI from the image data size and reading resolution. The one block pixel number BPI and one block line number BLI are previously set in the program for each reading resolution and are set to 50, respectively. The CPU 41 outputs, to the image reading apparatus 1, 2,500 as the one-line pixel number LPI, 3,600 as the one-page line number PLI, 50 as the one block pixel number BPI, and 50 as the one block line number BLI, together with the document reading start instruction.

The CPU 41 receives the JPEG data from the image reading apparatus 1 (M2). Specifically, after receiving the reading start signal from the image reading apparatus 1, the CPU 41 receives the color header information prepended to the JPEG data and then receives the JPEG data having YCbCr values in a compressed format.

After receiving the JPEG data, the CPU 41 receives the determination value JV from the image reading apparatus 1 (M3). Upon reception of the determination value JV, the CPU 41 starts data conversion processing to be described later.

The CPU 41 determines whether the reading operation has been ended (M4). Specifically, when receiving the reading start signal from the image reading apparatus 1 (No in M4), the CPU 41 determines that the reading operation has not been ended and proceeds to processing M2. When receiving the reading end signal from the image reading apparatus 1 (Yes in M4), the CPU 41 determines that the reading operation has been ended and ends the data reception processing.

(Data Conversion Processing)

Upon reception of the determination value JV, the CPU 41 starts data conversion processing illustrated in FIG. 8. The CPU 41 determines whether the determination value JV indicates a color page, a gray page, or a binary page (MA1). When the determination value JV indicates the color page (color in MA1), the CPU 41 proceeds to image data storage processing MA7. When the determination value JV indicates the binary page (binary in MA1), the CPU 41 proceeds to decompression processing MA2. When the determination value JV indicates the gray page (gray in MA1), the CPU 41 proceeds to header update processing.

When determining that the determination value indicates the binary page in processing MA1, the CPU 41 decompresses the JPEG data (MA2). Specifically, the CPU 41 decompresses the JPEG data and converts the same into the YCbCr format composed of a luminance Y, a red-difference Cr, and a blue-difference Cb.

The CPU 41 binarizes the luminance Y obtained in processing MA2 (MA3). Specifically, the CPU 41 sets the luminance Y to 1 when the luminance Y is equal to or higher than 128 in each pixel and sets the luminance Y to 0 when the luminance Y is lower than 128.

When determining that the determination value indicates the gray page in processing MA1, the CPU 41 updates the color header information (MA4). Specifically, the CPU 41 updates each of parameters Nf and Ns in the header information from a parameter representing three colors to a parameter representing one color. As a result of the update of each of the parameters Nf and Ns in the header information to a parameter representing one color, the JPEG data structure is changed from that having three color channels (luminance Y, red-difference Cr, and blue-difference Cb) to that having one color channel (luminance).

As in processing MA2, the CPU 41 decompresses the JPEG data (MA5). Specifically, the CPU 41 decompresses the JPEG data and converts the same into the YCbCr format composed of a luminance Y, a red-difference Cr, and a blue-difference Cb.

The CPU 41 deletes the red-difference Cr and the blue-difference Cb and compresses the luminance Y to generate the JPEG data (MA6). The CPU 41 generates gray JPEG data in which the header information updated in processing MA4 is prepended thereto and luminance Y is compressed.

The CPU 41 stores the image data in the storage unit 42 (MA7). When the determination value JV indicates the color page, the CPU 41 stores the JPEG data received from the image reading apparatus 1 in the storage unit 42. When the determination value JV indicates the binary page, the CPU 41 stores the binary data (black-white image data) generated in processing MA3 in the storage unit 42. When the determination value JV indicates the gray page, the CPU 41 stores the gray JPEG data generated in processing MA6 in the storage unit 42. After completion of processing MA7, the data conversion processing is ended.

<Technical Effect>

In the present embodiment, during the document reading operation in processing R2 to processing R5, the image reading apparatus 1 converts the read image into color JPEG data and transmits the JPEG data and the determination value JV to the computer 40. Thus, conversion into the JPEG data can be made before determining the determination value JV, making it possible to reduce a time until the JPEG data is transmitted to the computer 40.

In the present embodiment, the computer 40 receives the determination value JV after reception of the JPEG data. Upon reception of the determination value JV, the computer 40 generates image data on the basis of the determination value JV and stores the generated image data in the storage unit 42. Thus, the computer 40 can store the image data on the basis of the determination value JV without determining a type of the JPEG data, allowing reduction of a time until the image data is stored.

In the present embodiment, the computer 40 receives the determination value JV after receiving the JPEG data. Thus, the JPEG data, which is compressed image data, is transmitted/received, so that high speed communication can be performed. Further, the image reading apparatus 1 determines the determination value JV. This allows a determination to be more accurately made than when the compressed image data is used.

In the present embodiment, the block color determination unit 571 and the page color determination unit 572 each making color determination performs processing in parallel to the block binary/gray determination unit 581 and the page binary/gray determination unit 582. This allows reduction of a time until the determination value JV is determined.

When the determination value indicates the gray data, the CPU 41 changes the determination data to sub data indicating monochrome. Thus, the number of data to be stored in the storage unit can be reduced.

[Correspondence of Embodiment to Disclosure]

The image reading apparatus 1 is an example of an image reading device. The reading unit 24, the A/D converter 35, correction unit 36, and the YCbCr conversion unit 51 are collectively an example of a reading unit and a scanner. The JPEG encoder 52 and the I/F unit 39 are examples of a converting unit and a transmission unit, respectively. Specifically, the I/F unit 39 is also an example of a first interface. The CPU 30 is an example of a first controller. The block color determination unit 571, page color determination unit 572, block binary/gray determination unit 581, page binary/gray determination unit 582, and the determination value output unit 59 are collectively an example of a determining unit.

The computer 40, the storage unit 42, and the communication unit 43 are examples of an image storage device, a storage unit or a storage, and a receiving unit or a second interface, respectively. The CPU 41 executing the data conversion processing (MA1 to MA7) is an example of an image processing unit or a second controller. A configuration in which the image reading apparatus 1 and the computer 40 are connected to each other is an example of an image reading system.

The data acquisition unit 55, the block color determination unit 571, and the page color determination unit 572 are examples of a dividing unit, a color block determining unit, and a color page determining unit, respectively. The block binary/gray determination unit 581, the page binary/gray determination unit 582, and the determination value output unit 59 are examples of a monochrome block determining unit, a monochrome page determining unit, and a decision unit, respectively. The CPU 41 executing processing MA6 is an example of a changing unit.

[Modifications]

While the description has been made in detail with reference to specific embodiment thereof, it would be apparent to those skilled in the art that various changes and modifications may be made therein without departing from the spirit and scope of the above described embodiment.

(1) The image reading apparatus 1 of the present embodiment may be applied to a multifunction machine provided with a printer. The computer 40 is not limited to a general-purpose computer as long as it can store images.

Figure 9:
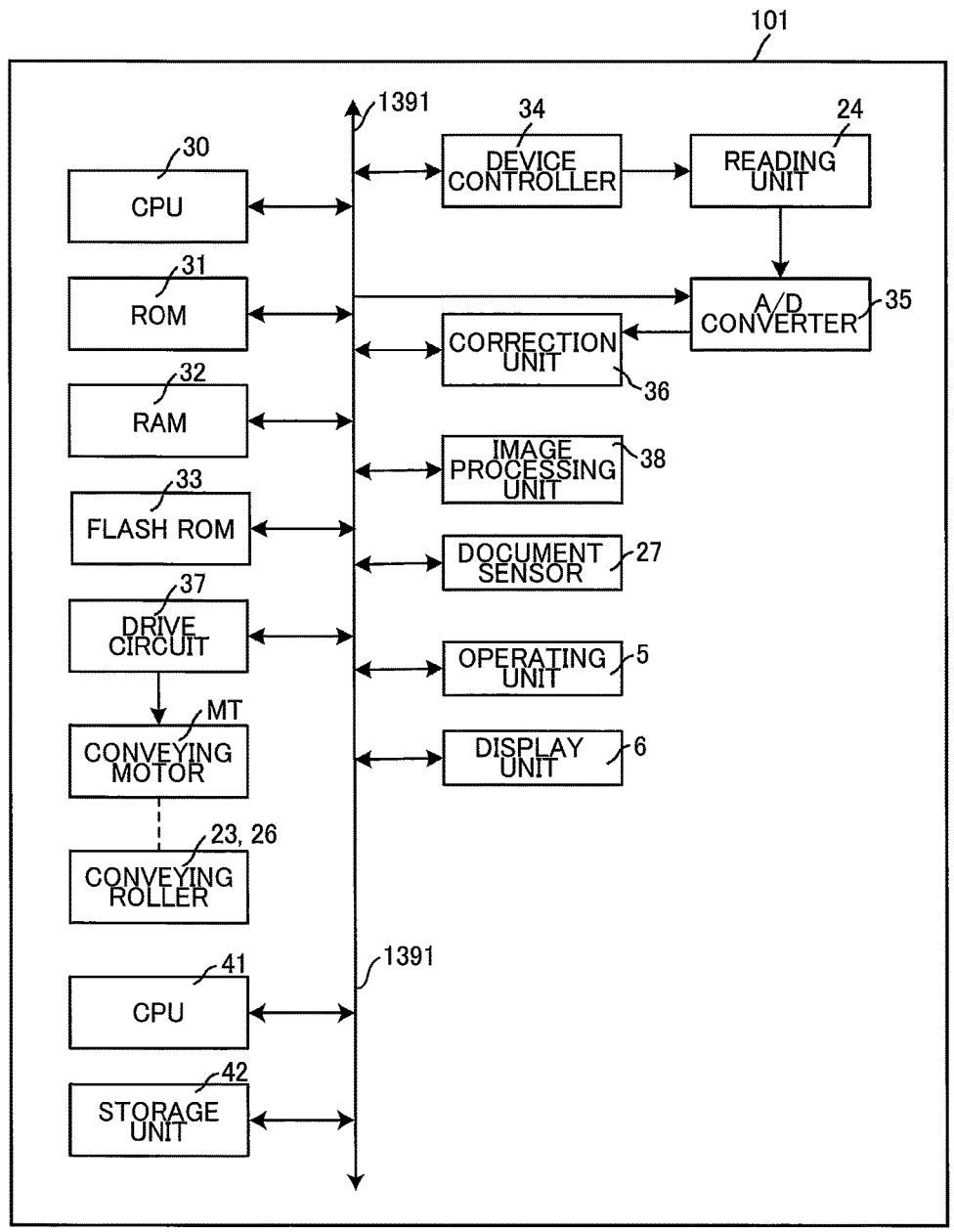
FIG. 9 indicates an electrical configuration of an image reading apparatus according to a modification.

The image reading apparatus 1 and the units in the computer 40 may be included in one apparatus. FIG. 9 illustrates an electrical configuration of an image reading apparatus 101 according to a modification. As illustrated in FIG. 9, the image reading apparatus 101 includes the CPU 41 and the storage unit 42 therein, but does not include the bus 44, the OF unit 39, or the communication unit 43. Each unit in the image reading apparatus 101 is connected to a bus 1391, and can communicate with each other via the bus 1391. The other settings and configurations are similar to the embodiment described above, and it will be appreciated that the image reading apparatus 101 also can provide the same effects as the embodiment.

(2) In the present embodiment, the memory unit 56 has a storage capacity corresponding to the number of pixels included in one page; however, the memory unit 56 may have a storage capacity corresponding to the number of pixels included in at least two blocks.

(3) In the present embodiment, the page color determination unit 572 sets the page color determination value PCJV by counting the number of color blocks; however, the page color determination unit 572 may set the page color determination value PCJV by counting the number of achromatic blocks.

(4) In the present embodiment, the page binary/gray determination unit 582 sets the page monochrome determination value PMJV by counting the number of gray blocks; however, the page binary/gray determination unit 582 may set the page monochrome determination value PMJV by counting the number of binary blocks.

(5) In the present embodiment, the color block is determined depending on whether or not 2,425 which is 97% of the total number of pixels in the block is exceeded; however, the color block may be determined based on a ratio of the number of pixels to the total number of pixels in the block.

(6) In the present embodiment, the binary block and the gray block are determined depending on whether or not 1,000 which is 40% of the total number of pixels in the block is exceeded; however, the binary block and the gray block may be determined based on a ratio of the number of pixels to the total number of pixels in the block.

(7) In the present embodiment, the color page is determined depending on whether or not 7.2 which is 0.2% of the total number of pixels in one page is exceeded; however, the color page may be determined based on a ratio of the number of pixels to the total number of pixels in one page.

(8) In the present embodiment, the binary page and the gray page are determined depending on whether or not 1.08 which is 0.03% of the total number of pixels in one page is exceeded; however, the binary page and the gray page may be determined based on a ratio of the number of pixels to the total number of pixels in one page.

What is claimed is:

1. An image reading system comprising an image reading device and an image storage device,
    wherein the image reading device comprises:
        a reading unit configured to read an original document on a pixel-to-pixel basis and generate image data including color difference data and luminance data;
        a converting unit configured to convert the image data to transmission data, the image data being compressed in converting to the transmission data;
        a determining unit configured to determine whether the image data is color data, gray data, or binary data, and configured to generate determination data indicating a result of the determination; and
        a transmission unit configured to transmit the transmission data and the determination data to the image storage device; and
    wherein the image storage device comprises:
        a storage unit;
        a receiving unit configured to receive the transmission data and the determination data both transmitted by the transmission unit; and
        an image processing unit configured to perform:
            when the determination data indicates that the image data is the color data, storing the transmission data in the storage unit;
            when the determination data indicates that the image data is the gray data, decompressing the transmission data to regenerate the image data, and storing the luminance data in the storage unit without storing the color difference data; and
            when the determination data indicates that the image data is the binary data, decompressing the transmission data to regenerate the image data, converting the luminance data of the regenerated image data to black-white image data, and storing the black-white image data in the storage unit,
    wherein the determining unit comprises:
    a dividing unit configured to divide the image data corresponding to one page of the original document into a plurality of blocks, each of the plurality of blocks including a plurality of pixels;
    a color block determining unit configured to perform:
        determining, when a total number of achromatic pixels contained in the block is less than or equal to a first threshold, that the block is a color block, the achromatic pixel subject to having a color difference falling within a prescribed range;
    a color page determining unit configured to determine, when the total number of the color blocks contained in the image data is greater than or equal to a first prescribed quantity, that the image data is the color data;
    a monochrome block determining unit configured to determine, when a total number of first pixels and second pixels is less than or equal to a second threshold, that the block is a gray block, the first pixel having a luminosity value greater than or equal to a first luminosity value, the second pixel having a luminosity value less than or equal to a second luminosity value, the second luminosity value being smaller than the first luminosity value;
    a monochrome page determination unit configured to perform:
        when a total number of the gray blocks is greater than a second prescribed quantity, determining that the image data is the gray data; and
        when the total number of the gray blocks is less than or equal to the second prescribed quantity, determining that the image data is the binary data; and
    a decision unit configured to decide:
        to generate the determination data indicating that the image data is the color data, in response to the determination that the image data is the color data; and
        to generate the determination data indicating that the image data is one of the gray data and the binary data, in response to the determination that the image data is the gray data or the determination that the image data is the binary data.

2. The image reading system according to claim 1, wherein the converting unit is configured to encode the luminance data and the color difference data and generate main data and sub data indicating a data structure of the main data, and to convert the image data to the transmission data by combining the main data and the sub data.

3. The image reading system according to claim 2, wherein the image processing unit comprises a changing unit configured to change the indication of the sub data from the color to achromatic, when the determination data indicates that the image data is the gray data.

4. An image reading device comprising a storage, the image reading device configured to perform:
   reading an original document on a pixel-to-pixel basis and generating image data including color difference data and luminance data;
   converting the image data to transmission data, the image data being compressed in converting to the transmission data, the converting the image data to the transmission data including:
      encoding the luminance data and the color difference data to generate main data and sub data indicating a data structure of the main data; and
      combining the main data and the sub data;
   determining whether the image data is color data, gray data, or binary data, and generating determination data indicating a result of the determination;
   when the determination data indicates that the image data is the color data, storing the transmission data in the storage;
   when the determination data indicates that the image data is the gray data, decompressing the transmission data to regenerate the image data, and storing the luminance data in the storage without storing the color difference data; and
   when the determination data indicates that the image data is the binary data, decompressing the transmission data to regenerate the image data, converting the luminance data of the regenerated image data to black-white image data, and storing the black-white image data in the storage.

5. An image reading system comprising an image reading device and an image storage device,
   wherein the image reading device comprises:
      a scanner;
      a first interface; and
      a first controller, wherein the first controller is configured to perform:
         controlling the scanner to read an original document on a pixel-to-pixel basis and generate image data including color difference data and luminance data;
         converting the image data to transmission data by compressing the image data, the converting the image data to the transmission data including:
            encoding the luminance data and the color difference data to generate main data and sub data indicating a data structure of the main data; and
            combining the main data and the sub data;
         determining whether the image data is color data, gray data, or binary data;
         generating determination data indicating a result of the determination; and
         controlling the first interface to transmit the transmission data and the determination data to the image storage device; and
   wherein the image storage device comprises:
      a storage;
      a second interface; and
      a second controller, wherein the second controller is configured to perform:
         receiving the transmission data and the determination data transmitted from the image reading device;
         storing the transmission data in the storage when the determination data indicates that the image data is the color data;
         converting the transmission data to the image data by decompressing the transmission data and store the luminance data of the image data in the storage without storing the color difference data of the image data when the determination data indicates that the image data is the gray data; and
         converting the transmission data to the image data by decompressing the transmission data, convert the luminance data of the image data to black-white image data and store the black-white image data in the storage when the determination data indicates that the image data is the binary data.

* * * * *